W. J. SMITH.
RESILIENT WHEEL.
APPLICATION FILED NOV. 11, 1908.
990,788.
Patented Apr. 25, 1911.
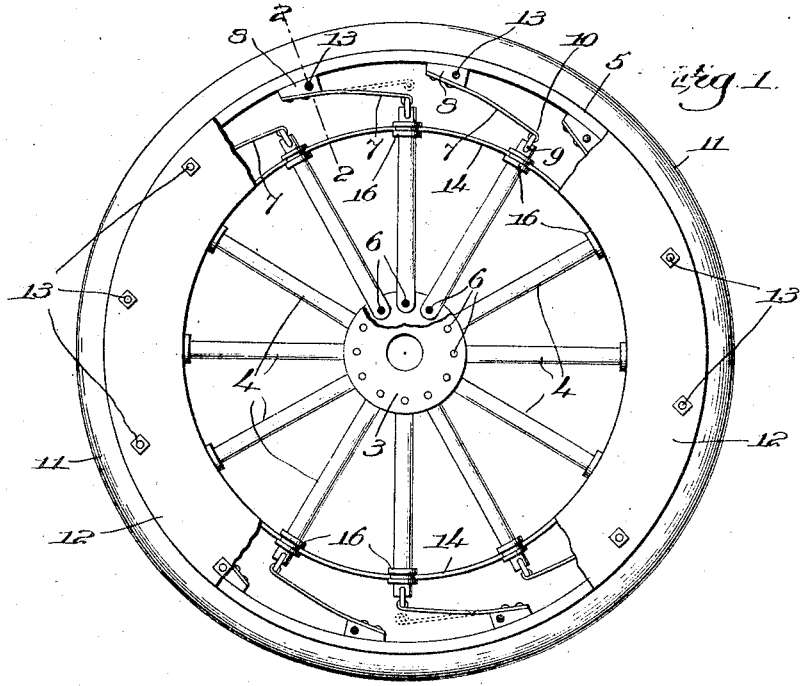
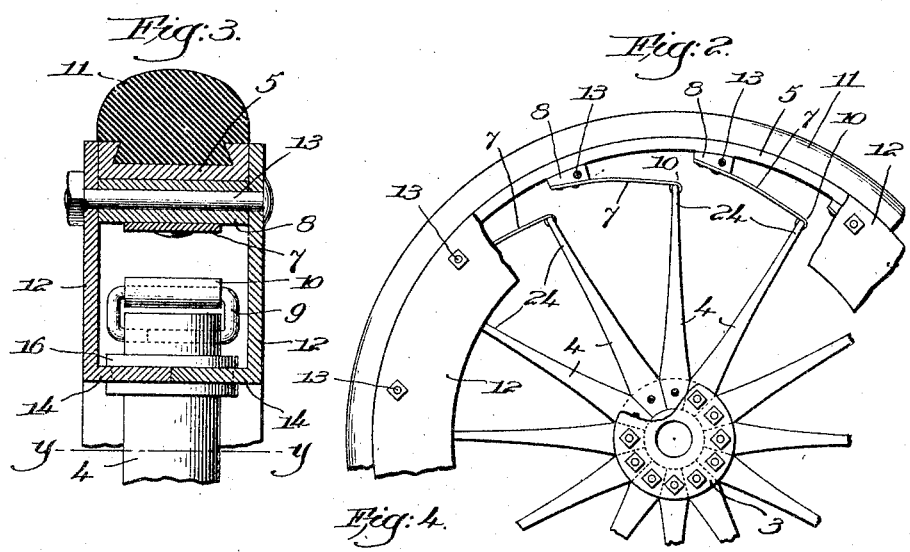
Witnesses,
Edward F. Allen
Joseph M. Ward.
Inventor:
William J. Smith,
by Denby & Gregory
Attys

UNITED STATES PATENT OFFICE.

WILLIAM J. SMITH, OF BOSTON, MASSACHUSETTS, ASSIGNOR OF ONE-HALF TO WILLIAM S. HENNESSY, JR., OF BOSTON, MASSACHUSETTS.

RESILIENT WHEEL.

990,788.  Specification of Letters Patent.  Patented Apr. 25, 1911.

Application filed November 11, 1908. Serial No. 462,083.

*To all whom it may concern:*

Be it known that I, WILLIAM J. SMITH, a citizen of the United States, residing at Boston, county of Suffolk, and State of Massachusetts, have invented an Improvement in Resilient Wheels, of which the following description, in connection with the accompanying drawing, is a specification, like letters on the drawing representing like parts.

This invention relates to resilient wheels and has for its object to provide a novel wheel of this construction which is simple in construction, effective in operation and which can be cheaply manufactured.

The features wherein my invention reside will be more fully hereinafter described and then pointed out in the appended claim.

In the drawings, Figure 1 is a side view of a wheel embodying my invention; Fig. 2 is a side view showing a modification; Fig. 3 is an enlarged section on the line 2—2, Fig. 1; Fig. 4 is a section on the line $y$—$y$, Fig. 3.

The wheel comprises a hub 3, spokes 4 and a rim 5. In the embodiment shown in Fig. 1 each spoke 4 is hinged to the hub 3 at 6 and has hinged to its outer end one end of a leaf or plate spring 7. The other end of each spring 7 is rigidly secured to the rim 5. This may conveniently be done by forming on the rim 5 a series of blocks or rests 8, each having a flat face to which the end of the spring 7 is riveted or bolted. Any suitable pivotal connection between the springs 7 and the spokes 4 may be employed.

I have herein shown each spoke as having pivoted thereto a link 9 which passes through an eye 10 formed in the end of the spring. The rim 5 is preferably channel or U-shape, as best seen in Fig. 3, and it may support a resilient tread member 11 if desired. On each side of the rim 5 is an annular plate 12 which is of sufficient width to cover the ends of the spokes 4. These plates 12 may be secured to the rim in various ways without departing from my invention, and as one convenient way I secure them in place by bolts 13 which are passed through the blocks 8 and through the plates 12. The plates 12 are provided at their inner edges with the inwardly-directed flanges 14 which form an annular box or chamber within which the ends of the spokes are received. The flanges 14 are provided with openings through which the spokes 4 extend, and these openings are preferably lined with rubber or other packing material 16. In any event, each spoke works through an opening formed in the flanges 14, which opening serves as a guide for the spoke. The packing 16 serves to make a tight joint and to prevent water or dirt from working into the space between the plates 12.

The construction of the wheel is such that the springs 7 are normally under slight tension, each spring being drawn inwardly slightly out of its neutral position by the spoke. As a result, each spring normally acts on its spoke tending to draw it outwardly, but because of the symmetrical arrangement of springs, the hub will, of course, be held in equilibrium. The dotted line at the upper side of Fig. 1 shows the normal or neutral position of the spring.

When a load is applied to the wheel, the hub will be depressed and the spokes directly beneath the hub will be forced toward the rim, while those above the hub will be drawn away from the rim. The outer ends of the spokes 4 which extend horizontally will remain stationary, but owing to the pivotal connection between the spokes and the hub the downward movement of the hub is freely permitted without putting strain on the horizontal spokes. When a load is applied to the hub of the wheel and the hub moves downwardly during the first part of such movement, the springs connected to the spokes beneath the hub will be carried toward and into their neutral position, while the springs connected to the spokes above the hub will be placed under still greater tension. During the first part of the downward movement of the hub, therefore, one set of springs is relieved of tension while the other set is put under greater tension. As the hub continues its downward movement, however, the springs connected to the spokes beneath the hub will be carried beyond their neutral position and thus placed under tension again, which tends to lift the hub upwardly and this, added to the tendency of the springs connected to the spokes above the hub to r ist downward movement of the huv, will serve to yieldingly support the load. With my construction a light load will be supported entirely by the springs connected to the spokes above the hub but if the load is sufficient so that the springs connected to the spokes below the hub are carried out or beyond their neutral position, then the load will be supported by the springs both above and below the hub.

The advantage of this construction is that a less number of springs is brought into play to support a light load than is brought into play to support a heavy load, and as a result a light load will be sustained with the same resiliency and cushion that a heavy load will be.

It will be obvious that if a set of springs is heavy enough to sustain a heavy load they may be so heavy that they will not give the proper resilient support to a light load.

Instead of pivoting the spokes to the hub as shown in Fig. 1, I may make the spokes rigid with the hub, as shown in Fig. 2. In this case, however, the spokes are made resilient at their outer ends, as at 24, so as to permit the up and down movement of the hub relative to the rim without putting undue strain on the spokes which stand horizontally. Where the spokes are fixed to the rim but made resilient, the horizontal spokes will be flexed at their outer ends 24 when the hub moves up and down.

Having described my invention, what I claim as new and desire to secure by Letters Patent is:—

In a resilient wheel, the combination with a rim having blocks on its inner face, of a hub having spokes, spring arms each secured at one end to a block and pivotally secured at the other end to a spoke, annular plates overlying the sides of the rim and extending inwardly therefrom and provided at their inner edges with flanges which meet each other and which are provided with apertures through which the spokes extend, and bolts extending through the blocks and plates and securing the plates to the rim.

In testimony whereof, I have signed my name to this specification, in the presence of two subscribing witnesses.

WILLIAM J. SMITH.

Witnesses:
LOUIS C. SMITH,
THOMAS J. DRUMMOND.